United States Patent
Bunn et al.

(10) Patent No.: US 6,962,324 B2
(45) Date of Patent: Nov. 8, 2005

(54) CABIN PRESSURE OUTFLOW CONTROL VALVE HAVING NON-LINEAR FLOW CONTROL CHARACTERISTICS

(75) Inventors: Andrew D. Bunn, Oro Valley, AZ (US); Darrell W. Horner, Oro Valley, AZ (US); Timothy R. Arthurs, Tucson, AZ (US)

(73) Assignee: Honeywell International, Inc., Morristown, NJ (US)

(*) Notice: Subject to any disclaimer, the term of this patent is extended or adjusted under 35 U.S.C. 154(b) by 71 days.

(21) Appl. No.: 10/427,176

(22) Filed: Apr. 30, 2003

(65) Prior Publication Data

US 2004/0217317 A1 Nov. 4, 2004

(51) Int. Cl.$^7$ ................................................ F16K 1/22
(52) U.S. Cl. ................................... 251/301; 251/305
(58) Field of Search ................................ 251/298–308

(56) References Cited

U.S. PATENT DOCUMENTS

| | | | |
|---|---|---|---|
| 2,391,197 A | | 12/1945 | Schwien |
| 2,723,615 A | * | 11/1955 | Morris et al. ............... 454/73 |
| 2,733,889 A | | 2/1956 | Mattingly |
| 2,846,934 A | * | 8/1958 | Mauldin ..................... 454/73 |
| 3,232,315 A | * | 2/1966 | Morelli ....................... 454/73 |
| 3,426,984 A | | 2/1969 | Emmons |
| 3,544,045 A | | 12/1970 | Butscher |
| 3,638,679 A | | 2/1972 | Gorchev |
| 3,672,630 A | | 6/1972 | Naumburg et al. |
| 3,740,006 A | | 6/1973 | Maher |
| 3,752,422 A | | 8/1973 | Runnels et al. |
| 4,033,247 A | | 7/1977 | Murphy |
| 4,390,152 A | * | 6/1983 | Jorgensen .................. 454/73 |
| 4,428,194 A | | 1/1984 | Stokes et al. |
| 4,432,514 A | * | 2/1984 | Brandon .................... 454/73 |
| 4,445,532 A | | 5/1984 | Mitchell |
| 4,458,718 A | | 7/1984 | Vick |
| 4,480,812 A | | 11/1984 | Carpentier |
| 4,480,815 A | | 11/1984 | Kreij |
| 4,553,474 A | | 11/1985 | Wong et al. |
| 4,635,899 A | | 1/1987 | Eshleman |
| RE32,554 E | | 12/1987 | Murphy |
| 4,768,555 A | | 9/1988 | Abel |
| 4,960,249 A | | 10/1990 | Signoret et al. |
| 4,964,422 A | | 10/1990 | Ball et al. |
| 4,964,431 A | | 10/1990 | Ball et al. |
| 4,967,778 A | | 11/1990 | Ball et al. |
| 5,000,213 A | | 3/1991 | Tervo et al. |

(Continued)

FOREIGN PATENT DOCUMENTS

| | | |
|---|---|---|
| GB | 770 547 A | 3/1957 |
| GB | 817 216 A | 7/1959 |

OTHER PUBLICATIONS

Utility Application Serial No. 10/014,135, filing date Dec. 13, 2001, by Sewa Sandhu and Kenyon Kehl entitled "Cable Assembly And Air Outflow Valve Incorporating The Same".

PCT International Search Report PCT/US2004/013528 dated Nov. 15, 2004.

PCT Written Opinion of the International Search Report dated Nov. 15, 2004.

*Primary Examiner*—John Rivell
(74) *Attorney, Agent, or Firm*—Ingrassia Fisher & Lorenz

(57) ABSTRACT

An aircraft cabin pressure outflow control valve that includes a rotationally mounted valve gate and one or more flow influencing walls adjacent to or part of to the valve body. Each wall has a distal edge formed at a wall angle relative to one of the valve flow ports, and an inner surface that surrounds the valve gate when the valve is at or near it closed position. With this configuration, the effective flow area of the flow port varies substantially non-linearly over a range of valve positions.

22 Claims, 3 Drawing Sheets

U.S. PATENT DOCUMENTS

| | | |
|---|---|---|
| 5,005,804 A | 4/1991 | Andersen et al. |
| 5,029,599 A | 7/1991 | Ball |
| 5,046,686 A | 9/1991 | Carla et al. |
| 5,048,686 A | 9/1991 | Carla et al. |
| 5,067,506 A | 11/1991 | Ball et al. |
| 5,102,097 A | 4/1992 | Davis et al. |
| 5,113,910 A | 5/1992 | Ball |
| 5,238,220 A | 8/1993 | Shell et al. |
| 5,334,090 A | 8/1994 | Rix |
| 5,351,934 A | 10/1994 | Jensen et al. |
| 5,386,848 A | 2/1995 | Gilchrist et al. |
| 5,590,852 A | 1/1997 | Olson |
| 5,899,064 A | 5/1999 | Cheung |
| 5,927,335 A | 7/1999 | Christensen |
| 6,006,780 A | 12/1999 | Tseng et al. |
| 6,116,541 A | 9/2000 | Chuang et al. |
| 6,233,919 B1 | 5/2001 | Abel et al. |
| 6,273,136 B1 | 8/2001 | Steinert et al. |
| 6,367,772 B1 * | 4/2002 | Glogovcsan, Jr. ............ 251/305 |
| 6,726,176 B2 * | 4/2004 | Bauman ..................... 251/305 |

* cited by examiner

CABIN PRESSURE OUTFLOW CONTROL VALVE HAVING NON-LINEAR FLOW CONTROL CHARACTERISTICS

FIELD OF THE INVENTION

The present invention relates to an aircraft cabin pressure outflow control valve and, more particularly, to an aircraft cabin pressure outflow control valve that exhibits non-linear flow control characteristics in at least certain valve positions.

BACKGROUND OF THE INVENTION

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

To maintain aircraft cabin altitude within a relatively comfortable range, cabin pressure control systems may be equipped with one or more outflow valves. An outflow valve can assist in controlling cabin pressure by regulating air flow out of the cabin. One particular type of outflow valve that may be used has a rotatable flapper or gate as the control element to regulate the flow of air out of the cabin. The flapper is coupled to a shaft that is rotationally mounted to the outflow valve body adjacent to the cabin side flow port. An actuator, which is coupled to the shaft, positions the flapper element in response to commands from a controller to thereby regulate the air flow out of the cabin.

Although the above-described type of outflow valve is believed to be generally safe and reliable, is fairly simple to design and construct, and thus fairly inexpensive, under certain circumstances it may exhibit certain drawbacks. One particular drawback relates to flow control resolution around the closed position. In particular, when the flapper is positioned at or near its closed position, small changes in valve position can result in relatively large changes in flow area. As a result of this particular characteristic, flow control resolution difficulties may be exhibited around the closed position. This is potentially significant, since the outflow valve is operated with the flapper in or near its closed position for most operational conditions.

Hence, there is a need for an outflow valve that is fairly simple to design and construct, and that is relatively inexpensive, and that additionally overcomes the above-noted drawback. Namely, a relatively simple, inexpensive valve that does not exhibit relatively large changes in flow area with relatively small changes in position when the valve is at or near its closed position, and/or does not exhibit control difficulties around the closed position. The present invention addresses these needs.

SUMMARY OF THE INVENTION

The present invention provides a relatively simple, inexpensive aircraft cabin pressure control valve that includes a gate as its flow control element, which does not exhibit relatively large changes in flow area with relatively small changes in position when the gate is at or near its closed position. As a result, the valve also exhibits good flow control resolution around the closed position.

In one embodiment, and by way of example only, an aircraft cabin pressure outflow control valve includes a valve body, a valve gate, and one or more walls. The valve body is adapted to mount in the fuselage of an aircraft and has at least a first flow port, a second flow port, and a flow passage therebetween. The valve gate is rotationally mounted on the valve body proximate the first flow port, and is rotatable between a plurality of valve angles relative to the first flow port to thereby control an effective flow area therethrough. The valve gate is in a closed position when the valve angle is zero degrees. Each of the one or more walls has at least a distal edge, an inner surface, and an outer surface. Each wall inner surface surrounds at least a portion of the valve gate at least when the valve angle is zero degrees. Each wall distal edge is formed at a wall angle relative to the first flow port. The effective flow area through the first flow port varies substantially non-linearly with valve angle for valve angles from zero degrees up to a predetermined number of degrees.

In another exemplary embodiment, an aircraft cabin pressure outflow control valve includes a valve body, a valve gate, a controller, a valve actuator, and one or more walls. The valve body is adapted to mount on the fuselage of an aircraft and has at least a first flow port, a second flow port, and a flow passage therebetween. The valve gate is rotationally mounted on the valve body proximate the first flow port, and is rotatable between a plurality of valve angles relative to the first flow port to thereby control an effective flow area therethrough. The valve gate is in a closed position when the valve angle is zero degrees. The controller circuit is mounted on the valve body and is operable, in response to one or more aircraft cabin pressure signals, to supply a valve actuation signal. The valve actuator is mounted on the valve body and is operable, in response to the valve actuation signals, to position the valve gate at a valve angle. Each of the one or more walls has at least a distal edge, an inner surface, and an outer surface. Each wall inner surface surrounds at least a portion of the valve gate at least when the valve angle is zero degrees. Each wall distal edge is formed at a wall angle relative to the first flow port. The effective flow area through the first flow port varies substantially non-linearly with valve angle for valve angles from zero degrees up to a predetermined number of degrees.

In still another exemplary embodiment, an aircraft cabin pressure control valve includes a valve body, one or more valve gates, and one or more walls. The valve body is adapted to mount in the fuselage of an aircraft, and has at least a first flow port, a second flow port, and a flow passage therebetween. Each of the valve gates is mounted on the valve body proximate the first flow port, and is moveable between a plurality of positions relative to the first flow port to thereby control an effective flow area therethrough. The walls are located adjacent to the valve body, and each has at least a distal edge, an inner surface, and an outer surface. Each wall inner surface surrounds at least a portion of the valve gates at least when the gate is closed, and each wall distal edge is formed at a wall angle relative to the first flow port. The effective flow area through the first flow port varies substantially non-linearly with gate position for gate positions varying from the closed position to a predetermined open position.

Other independent features and advantages of the preferred outflow control valve will become apparent from the following detailed description, taken in conjunction with the accompanying drawings which illustrate, by way of example, the principles of the invention.

DETAILED DESCRIPTION OF A PREFERRED EMBODIMENT

Figure 1:
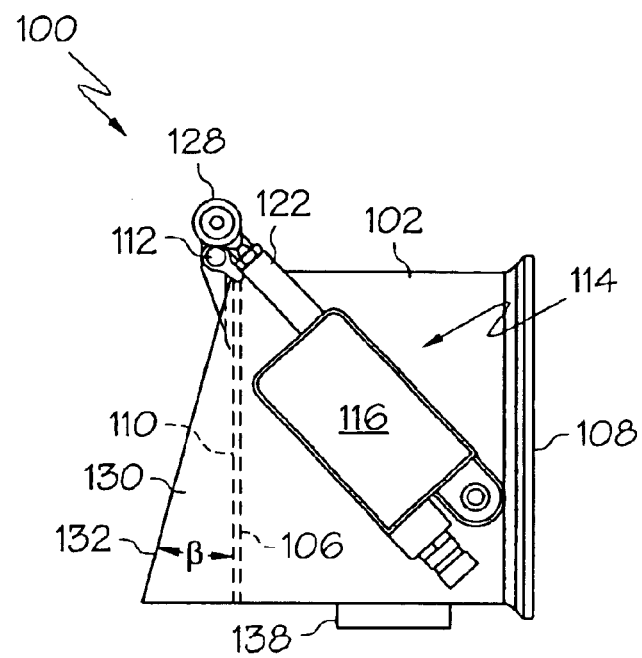
FIGS. 1 and 2 are side and perspective views, respectively, of an aircraft cabin pressure outflow control valve according to an exemplary embodiment of the present invention, with the valve in the fully closed position.

An exemplary embodiment of an air outflow valve that may be used to control aircraft cabin pressure is shown in FIGS. 1–4. As can be seen, the outflow valve 100 includes a valve body 102 having a fluid flow passageway 104 that passes through the valve 100 between a first flow port 106 and a second flow port 108. The valve body 102 is preferably adapted to mount to an aircraft fuselage (not shown), such that the first flow port 106 is in fluid communication with the aircraft cabin and the second flow port 108 is in fluid communication with the ambient environment outside the fuselage.

Figure 2:
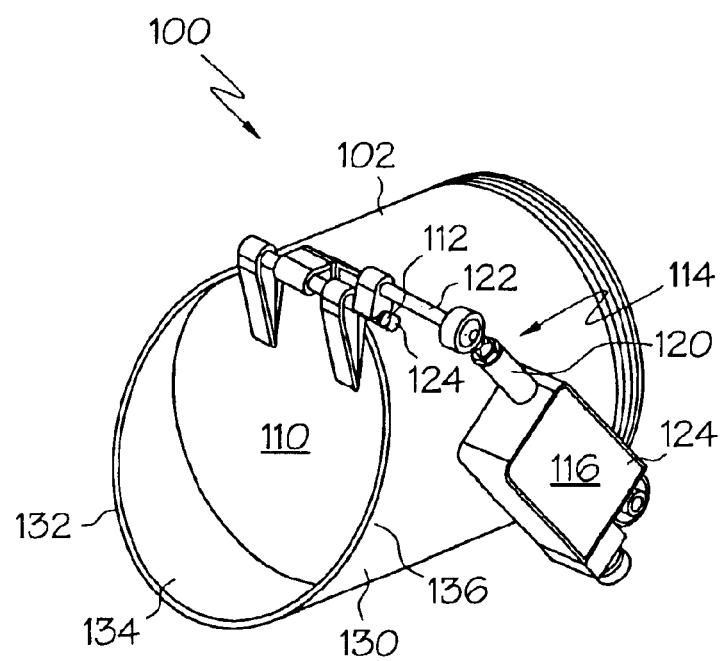
Figure 3:
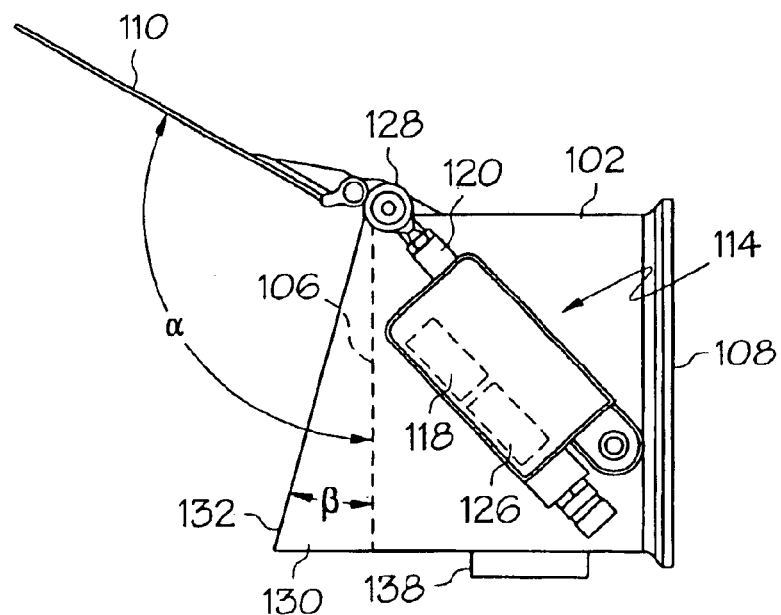
FIGS. 3 and 4 are side and perspective views, respectively, of the exemplary valve shown in FIGS. 1 and 2, with the valve in the fully open position.
Figure 4:
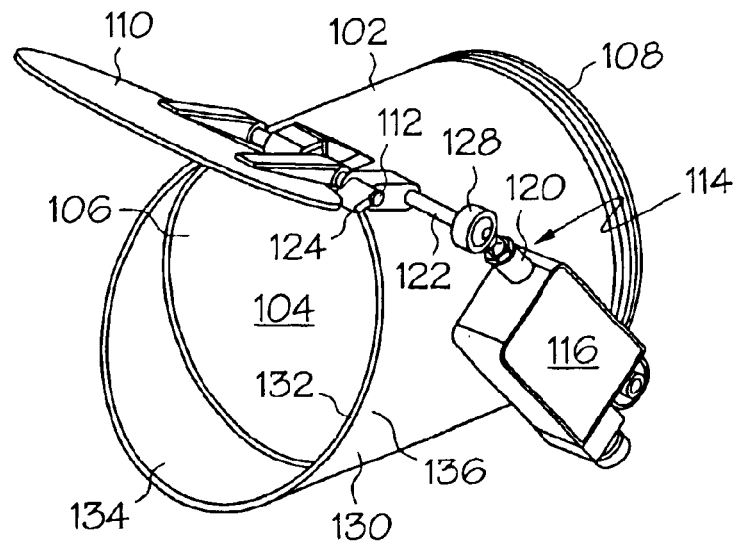

The valve 100 includes a valve gate 110 that is rotatable through a plurality of positions, from a fully closed position, as shown in FIGS. 1 and 2, to a fully open position, as shown in FIGS. 3 and 4, to thereby control cabin pressure in the aircraft cabin into which it is installed. To provide this rotation, the valve gate 110 is rotationally mounted on a shaft 112, which is itself rotationally mounted on the valve body 102 proximate the first flow port 106. The valve gate 110 may be biased toward the fully closed position by aerodynamic pressure, gravity, or by a gravity-assisting biasing element such as a spring. An actuator assembly 114, an embodiment of which will now be described, engages the valve gate 110 to rotate it to the desired position.

The actuator assembly 114 is preferably mounted on the valve body 102, though it will be appreciated that it could be disposed remote from the valve body 102, and may be any one of numerous known actuator configurations. In the depicted embodiment, the actuator assembly 114 includes a housing 116, one or more motors 118 (shown in phantom in FIG. 3), an actuator arm 120, an actuator shaft 122, and a valve movement tab 124. The motors 118 may be any one of numerous known motor types including, but not limited to, electric, hydraulic, and pneumatic, and may be any one of numerous configurations including, but not limited to, linear and rotary motors. The motors 118 are coupled, preferably via appropriate gearing 126, to one end of the actuator arm 120. In the depicted embodiment, the actuator arm 120 is one of numerous types of mechanisms such as, a jackscrew or ball screw, in which rotation of one portion of the mechanism results in translation of another portion. The actuator arm 120 includes a rod end member 128, which is coupled to the actuator shaft 122, and which is in turn coupled to the valve movement tab 124. The valve movement tab 124 is coupled to the valve shaft 112 and, as was alluded to above, engages the valve gate 110 to move it to the desired position. With this configuration, in the unlikely event that one or more of the actuator assembly components failed, air pressure would urge the valve gate 110 toward is fully closed position, providing an inherently fail-safe configuration.

The position of the valve gate 110 may be expressed in terms of valve angle ($\alpha$), relative to the first flow port 106. Thus, in the fully closed position (FIGS. 1 and 2), the valve angle (a) is zero degrees, and the valve gate 110 blocks substantially the entire first flow port 106, and thus substantially blocks flow between the first 106 and second 108 flow ports. Conversely, in an open position (FIGS. 3 and 4), the valve angle ($\alpha$) is non-zero, and the valve gate 110 does not block substantially the entire first flow port 106, allowing fluid flow between the first 106 and second 108 flow ports. As will be discussed in more detail below, the effective flow area, and thus the flow resistance between the first 106 and second 108 flow ports, varies with valve angle ($\alpha$).

As FIGS. 1–4 additionally show, a flow influencing wall 130 is coupled to the valve body 102 and extends from the first flow port 106. In the depicted embodiment, the wall 130 includes a distal edge 132, an inner surface 134, and an outer surface 136. The wall distal edge 132 is configured to form an angle ($\beta$) relative to the first flow port 106. It will be appreciated that the wall distal edge angle ($\beta$) may vary from point to point, but is preferably a constant. As will be discussed in more detail below, the magnitude of the wall distal edge angle ($\beta$) is set based on the particular flow characteristics desired from the valve 100. As shown most clearly in FIGS. 1 and 2, the wall inner surface 134 surrounds at least a portion of the valve gate 110 when the valve 100 is in or near its closed position. It will be appreciated that the wall 130 may be separately or integrally formed with, or coupled to, the valve body 102.

The actuator assembly 114 is adapted to receive valve position control signals from, for example, a controller circuit 138. In response to the received signals, the actuator assembly 114 rotates the valve gate 110 to the commanded valve angle ($\alpha$). The controller circuit 138 is preferably mounted on the valve body 102, and is configured in either a single channel or dual channel (or more) architecture. In either case, each channel includes the instrumentation and control circuitry that is used, among other things, to supply valve position command signals to the valve actuator assembly 114. The circuitry may be variously configured but, in a particular preferred embodiment, is configured similar to the circuitry described in commonly assigned, and presently pending, U.S. patent application Ser. No. 10/080,107, entitled "Instrumentation and Control Circuit having Multiple, Dissimilar Sources for Supplying Warnings, Indications, and Controls and an Integrated Cabin Pressure Control System Valve Incorporating the Same," which was filed on Feb. 21, 2002, and the entirety of which is hereby incorporated by reference.

Figure 5:
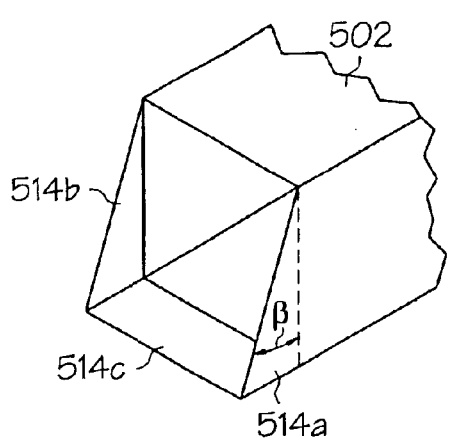
FIG. 5 is a perspective view of a valve body of a cabin pressure outflow control valve according to an exemplary alternative embodiment of the present invention.

The valve 100 illustrated in FIGS. 1–4 has a valve body 102 that is substantially circular in cross-section. It will be appreciated, however, that the valve 100 is not limited to a circular valve body 102. Indeed, numerous cross sections such as, for example, square and rectangular cross sections may also be implemented. An example of a valve body 502 of square cross section is shown in FIG. 5. In this particular embodiment, three walls 514a–c are coupled to the valve body 502. These three walls 514a–c may be separately or integrally formed with one another, and/or separately or integrally formed with, or coupled to, the valve body 502.

Figure 6:
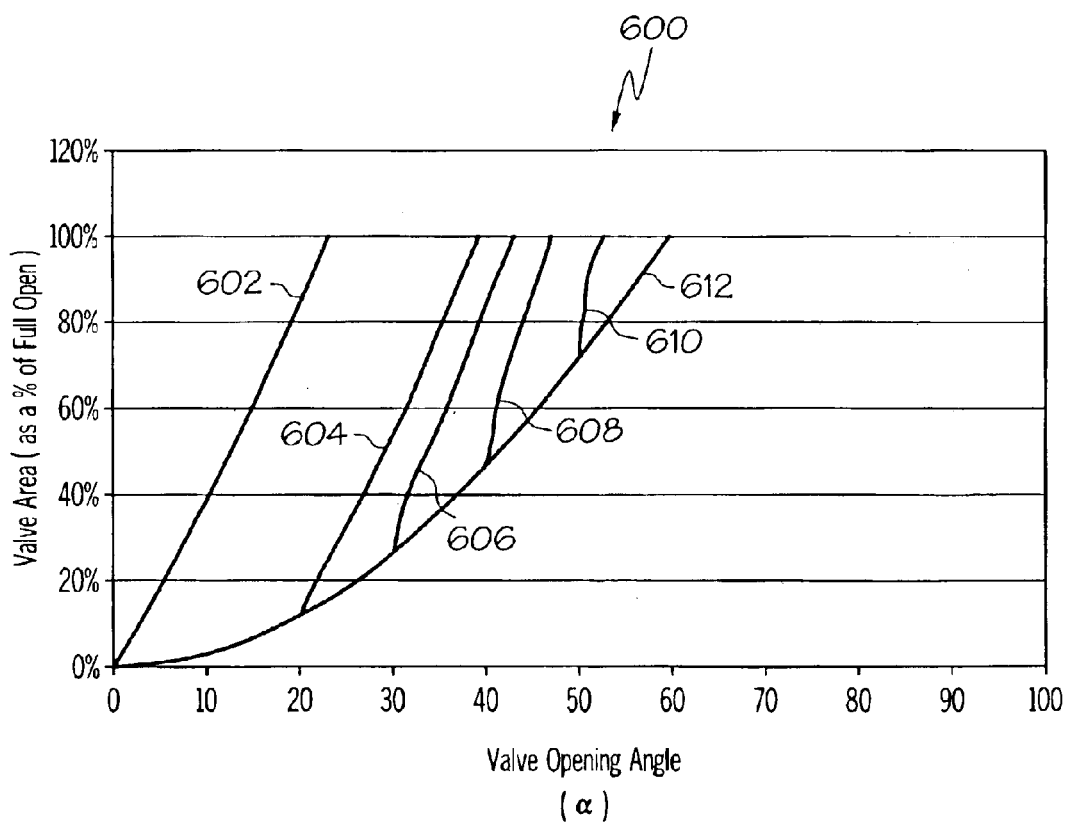
FIG. 6 is a graph depicting effective flow area vs. valve position for various structural configurations of the valve shown in FIG. 5.

As was noted above, the wall 130, 514 influences the flow characteristics of the valve 100. In particular, the wall distal edge angle ($\beta$) is selected so that the effective flow area of the first flow port 106 is non-linear with respect to valve angle ($\alpha$), at least around the fully closed position. In this way, flow control is improved when the valve gate 110 is positioned near the fully closed position. This phenomenon is illustrated in FIG. 6, which is a graph depicting effective flow area (as a percentage of full-open) vs. valve angle ($\alpha$) for various wall distal edge angles ($\beta$). For ease of calculation, the graph 600 is based on a valve 100 having a square cross section, such as the one illustrated in FIG. 5, and with coefficient of discharge ($C_d$) effects ignored. The graph 600 shows that when no walls 130, 514 are provided, the curve 602 of flow area vs. valve angle ($\alpha$) is substantially linear, with a fairly steep slope, between zero and approximately 20 degrees. Thereafter, the curve 602 exhibits a substantially zero slope for valve angles ($\alpha$) above 20 degrees.

However, when walls 130, 514 are included, the curve of flow area vs. valve angle ($\alpha$) is non-linear, with a significantly reduced slope, for valve angles ($\alpha$) between zero degrees and a first predetermined valve angle. As FIG. 6 shows, this first predetermined valve angle depends at least in part on the wall distal edge angle ($\beta$). For example, for a wall distal edge angle ($\beta$) of about 20°, the curve 604 is non-linear for valve angles ($\alpha$) between 0° and approximately 20°, and is substantially linear for valve angles ($\alpha$) between this value and a second predetermined valve angle, at which point the curve 604 exhibits a substantially zero slope. Similarly, for wall distal edge angles ($\beta$) of approximately 30°, 40°, and 50°, the curves 606, 608, and 610, respectively, are non-linear for valve angles between 30°, 40°, and 50°, respectively, are substantially linear for valve angles ($\alpha$) up to a second predetermined valve angle, and have a substantially zero slope thereafter. It is also seen that for a wall distal edge angle ($\beta$) of approximately 60°, the curve 612 has no substantially linear region. Instead, it is non-linear for valve angles ($\alpha$) between 0° and approximately 60°, and has a substantially zero slope thereafter.

Figure 7:
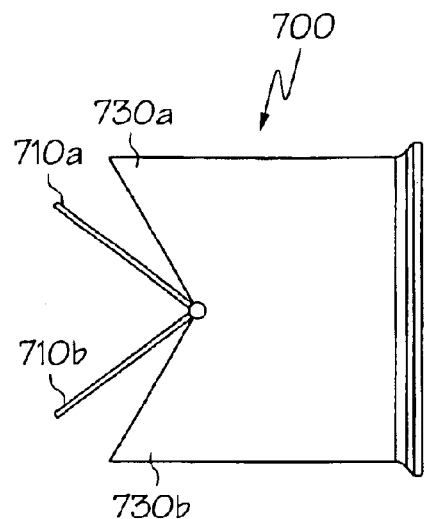
FIG. 7 is a side view of a cabin pressure outflow control valve according to another exemplary alternative embodiment of the present invention.

The valves illustrated in FIGS. 1–5 are each configured with a single gate 110. However, it will be appreciated that the valve 100 could also be configured with more than one gate 110 mounted on one or more rotationally mounted shafts 110. For example, FIG. 7 shows a simplified side view of a valve 700 configured with two valve gates 710a and 710b. With this configuration, the valve 700 may include a single flow influencing wall or, as in the depicted embodiment, two flow influencing walls 730a and 730b, one per gate 710a and 710b, respectively.

Including one or more flow influencing walls as described above changes the flow area vs. valve angle characteristic curve, such that the slope of the curve, at least around the closed position, is non-linear and significantly less than a valve without the flow influencing walls. This provides improved flow control resolution of the valve around the closed position, which is where a cabin pressure outflow control valve is operated for a significant amount of time. With improved flow control resolution, one or more drawbacks associated with using a fairly simple, and relatively inexpensive type of valve configuration for an outflow valve, such as those described above, may be overcome.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft cabin pressure control valve, comprising:

a valve body adapted to mount on the fuselage of an aircraft and having at least a first flow port, a second flow port, and a flow passage therebetween;

one or more valve gates rotationally mounted on the valve body proximate the first flow port, each valve gate rotatable between a plurality of valve angles relative to the first flow port to thereby control an effective flow area therethrough, wherein each valve gate is in a closed position when the valve angle is zero degrees; and one or more walls adjacent to the valve body, each wall having at least a distal edge, an inner surface, and an outer surface, each wall inner surface surrounding at least a portion of at least one of the valve gates at least when its valve angle is zero degrees, and each wall distal edge formed at a non-zero wall angle relative to the first flow port, whereby the effective flow area through the first flow port varies substantially non-linearly with valve angle for valve angles from zero degrees up to a predetermined number of degrees.

2. The valve of claim 1, wherein the predetermined number of degrees depends, at least in part, on the wall angle.

3. The valve of claim 1, wherein the first flow port is substantially cylindrical in cross section.

4. The valve of claim 1, wherein the first flow port is substantially trapezoidal in cross section.

5. The valve of claim 1, wherein one or more of the walls is integrally coupled to the first flow port.

6. The valve of claim 1, wherein:

the flow passage is symmetric about a flow axis that extends between the first and second flow ports; and the first flow port is configured substantially perpendicular to the flow axis.

7. The valve of claim 1, wherein:
the flow passage is symmetric about a flow axis that extends between the first and second flow ports; and
the first flow port is configured at a non-perpendicular angle relative to the flow axis.

8. The valve of claim 1, further comprising:
a controller circuit mounted on the valve body and operable, in response to one or more aircraft cabin pressure signals, to supply one or more valve actuation signals; and
a valve actuator mounted on the valve body, the valve actuator adapted to receive the valve actuation signals and operable, in response thereto, to position each valve gate at a valve angle.

9. An aircraft cabin pressure control valve, comprising:
a valve body adapted to mount on the fuselage of an aircraft and having at least a first flow port, a second flow port, and a flow passage therebetween;
one or more valve gates rotationally mounted on the valve body proximate the first flow port, each valve gate rotatable between a plurality of valve angles relative to the first flow port to thereby control an effective flow area therethrough, wherein each valve gate is in a closed position when the valve angle is zero degrees;
a controller circuit mounted on the valve body and operable, in response to one or more aircraft cabin pressure signals, to supply one or more valve actuation signals;
a valve actuator mounted on the valve body, the valve actuator adapted to receive the valve actuation signals and operable, in response thereto, to position each valve gate at a valve angle; and
one or more walls each having at least a near edge, a distal edge, an inner surface, and an outer surface, at least a portion of each wall near edge coupled to at least a portion of the first flow port, each wall inner surface surrounding at least a portion of one of the valve gates at least when its valve angle is zero degrees, and each wall distal edge formed at a non-zero wall angle relative to the first flow port,
whereby the effective flow area of the first flow port varies substantially non-linearly with valve angle for valve angles from zero degrees up to a predetermined number of degrees.

10. The valve of claim 9, wherein the predetermined number of degrees depends, at least in part, on the wall angle.

11. The valve of claim 9, wherein the first flow port is substantially cylindrical in cross section.

12. The valve of claim 9, wherein the first flow port is substantially trapezoidal in cross section.

13. The valve of claim 9, wherein one or more of the walls is integrally coupled to the first flow port.

14. The valve of claim 9, wherein:
the flow passage is symmetric about a flow axis that extends between the first and second flow ports; and
the first flow port is configured substantially perpendicular to the flow axis.

15. The valve of claim 9, wherein:
the flow passage is symmetric about a flow axis that extends between the first and second flow ports; and
the first flow port is configured at a non-perpendicular angle relative to the flow axis.

16. An aircraft cabin pressure control valve, comprising:
a valve body adapted to mount in the fuselage of an aircraft, the valve body having at least a first flow port, a second flow port, and a flow passage therebetween;
one or more valve gates mounted on the valve body proximate the first flow port, each valve gate moveable between a plurality of positions relative to the first flow port to thereby control an effective flow area therethrough; and
one or more walls located adjacent to the valve body, each wall having at least a distal edge, an inner surface, and an outer surface, each wall inner surface surrounding at least a portion of the valve gates at least when the gate is closed, and each wall distal edge formed at a non-zero wall angle relative to the first flow port,
whereby the effective flow area through the first flow port varies substantially non-linearly with gate position for gate positions varying from the closed position to a predetermined open position.

17. The valve of claim 16, wherein the first flow port is substantially cylindrical in cross section.

18. The valve of claim 16, wherein the first flow port is substantially trapezoidal in cross section.

19. The valve of claim 16, wherein one or more of the walls is integrally coupled to the first flow port.

20. The valve of claim 16, wherein:
the flow passage is symmetric about a flow axis that extends between the first and second flow ports; and
the first flow port is configured substantially perpendicular to the flow axis.

21. The valve of claim 16, wherein:
the flow passage is symmetric about a flow axis that extends between the first and second flow ports; and
the first flow port is configured at a non-perpendicular angle relative to the flow axis.

22. The valve of claim 16, further comprising:
a controller circuit mounted on the valve body and operable, in response to one or more aircraft cabin pressure signals, to supply one or more valve actuation signals; and
a valve actuator mounted on the valve body, the valve actuator adapted to receive the valve actuation signals and operable, in response thereto, to position each valve gate.

* * * * *